Patented May 18, 1948

2,441,587

UNITED STATES PATENT OFFICE 2,441,587

METHOD OF PREPARING COMPOSITION OF MATTER SUITABLE FOR USE AS A LUBRICANT AND AS AN ADDITION AGENT TO LUBRICANTS

John M. Musselman, South Euclid, Ohio, assignor to The Standard Oil Company, Cleveland, Ohio, a corporation of Ohio No Drawing. Application July 25, 1944, Serial No. 546,565

11 Claims. (Cl. 260—399)

This invention relates to an improvement in a process for making a composition of matter which is adapted for use as a lubricant by itself or which can be added to oils and greases to improve their lubricating properties. The invention, in particular, concerns an improved method of making an additive for mineral lubricating oils.

In my Patent No. 2,331,923, granted October 19, 1943, there is disclosed a process in which a wax, such as degras, is reacted with a sulfide of phosphorus, such as phosphorus pentasulfide ($P_2S_5$). The reaction product thereby formed is separated from a by-product residue, and the separated reaction product may be used as such or it may be converted to the corresponding basic compound thereof, for example, the corresponding calcium salt or soap.

The reaction product of the wax and the $P_2S_5$, and also the basic compounds thereof, may be used as such, but preferably they are incorporated in oils and other lubricants of various types to inhibit a breakdown of the lubricant, such as by minimizing the formation of acid and sludge in the lubricant and maintaining a desirable condition on the surface of the motor in which the lubricants are used.

A study of the reaction between the wax and the $P_2S_5$ has led to the conclusion that a phosphorus oxide, probably in the form of phosphorus pentoxide ($P_2O_5$), is a by-product of the reaction between the wax and the $P_2S_5$ and results from the replacement of at least a part of the oxygen in the wax by sulfur from the $P_2S_5$, and a chemical combination between said replaced oxygen and the phosphorus of the $P_2S_5$.

If this conclusion is correct, the by-product residue which separates from the reaction product contains the phosphorus oxide by-product. It seems likely that this phosphorus oxide may act as a catalyst during the reaction, particularly as its content increases toward the end of the reaction. The phosphorus oxide probably exerts a polymerizing effect upon any unreacted wax and upon the wax-$P_2S_5$ reaction product, whereby an amount of the raw material and/or the reaction product is polymerized and separates with the residue. An exact explanation of the chemical phenomena involved is not necessary to understand the invention, but a large portion of this residue may be comprised of such polymerization products or the combination thereof with the phosphorus.

This conclusion seems to be supported by the fact that an appreciable amount of the residue is not formed in the first part of the reaction, but is formed in larger amounts toward the end of the reaction after more than half of the phosphorus sulfide has been reacted.

When the process described in the above referred to patent is carried out on a commercial scale, a very desirable product is formed. However, the separable by-product residue or sludge forms in the initial reaction between the wax and the $P_2S_5$, and the yield of the reaction product is not as great as is desirable for a highly economic utilization of the raw materials. While carefully controlled laboratory operations can be made to give better yields, large scale operations using large quantities of available crude materials under plant conditions where accurate control is not possible, leaves much to be desired in the way of yields.

These lower yields may be attributed in part to the fact that the reaction is exothermic, and that it is difficult to dissipate the heat formed by a large amount of the reaction in a large kettle. This difficulty often makes it necessary to operate at a temperature somewhat higher than the optimum temperature, or to continue the reactants for a time longer than the optimum, or both, neither of which are conducive to good yields.

It is an object of the present invention to carry out the reaction between a sulfide of phosphorus and oxygen containing raw material, such as an ester type wax, in such a way as to improve the yield of the reaction product and reduce the amount of sludge formed.

It is a further object of the invention to carry out said reaction so that any phosphorus and oxygen-containing by-product that is formed is chemically modified in such a way as to greatly minimize its polymerizing or other degrading effect.

More particularly it is an object of the invention to carry out the reaction between the oxygen-containing raw material and a part of the phosphorus sulfide, following which any phosphorus and oxygen-containing by-product is neutralized before the remainder of the phosphorus sulfide is added and the reaction completed.

It is an additional object of the invention to modify any phosphorus and oxygen-containing by-product so that it may be readily separated in a crystalline form easily separable without entraining an appreciable amount of organic material.

Still a further object of the invention is the provision of a process by which the improved yields of the additive are obtained without detracting in any way from the desirable properties of the additive.

In order that my invention may be fully and better understood, I will proceed at once with a description of a specific example, following which I will indicate the nature of the equivalents and variations that may be made from the specific example, without departing from the invention.

In accordance with this example of the improved process, which is given merely as illustrative, 1,000 pounds of degras is mixed with 1,000 pounds of a mineral lubricating oil of the type in which the additive is to be eventually used. The mixture is placed in a large kettle equipped with an agitator, and preferably with heating and cooling coils to control the temperature, should this be necessary. To this mixture is added one-half of the amount of $P_2S_5$ to be used in the reaction, namely 115 pounds. The reaction is exothermic and it is desirable to add the $P_2S_5$ in increments at such a rate that a temperature of about 300° F. is maintained. The mixture is agitated continuously to obtain uniformity in the product and the heat distribution. If desired, the mixture of degras and mineral oil may be heated to an initial temperature of about 250° F. before the first increment of $P_2S_5$ is added. The time over which the $P_2S_5$ is added may be shortened by cooling the mixture, such as by circulating cold water in the cooling coils to absorb the heat generated in the exothermic reaction. Generally this expedient need not be utilized and the $P_2S_5$ may be added stepwise as fast as can be done while maintaining the reaction temperature within the range of about 290° to 310° F. After a reaction time of 1 hour, at a temperature of about 300° F., there is added 40 pounds of hydrated lime which has been wet with an equal amount of water. The mixture is agitated at a temperature of about 300° F., for 1 hour. The second half of the $P_2S_5$ is then reacted, namely an additional 115 pounds, and this is added in increments in the same manner as described above. The reaction time for the second addition of $P_2S_5$ is 1 hour, at a temperature of about 300° F. Following this there is added an additional 40 pounds of hydrated lime, containing an equal amount of water, and the reaction continued to a temperature of 300° F. for 1 hour.

At the end of this time, the agitation is stopped and the reaction mixture is permitted to stand quiescent, during which time the by-products separate in the bottom of the kettle and the reaction product may be drawn off from the top. Centrifugal separation may be utilized to speed the separation, but this is not essential because of the ease with which the by-products separate, due to the form they take in accordance with the invention.

In this example, it will be noted that the degras is mixed with an equal amount of a mineral lubricating oil which does not enter into the reaction and which acts primarily as a diluent. It is to be emphasized, however, that the process of the invention in this application may be practiced without the inclusion of the mineral oil, since it is not essential to obtain the benefits claimed herein. Its use represents a commercial adaptation of the process, since the final reaction product is usually marketed in admixture with a lubricating oil and it is therefore convenient to add it at the start of the reaction.

The following tabulation summarizes the details of the improved process and the yields obtained, as compared with a process otherwise identical except that hydrated lime was not added midway or at the end of the reaction:

| | Improved Process | Comparative Process |
|---|---|---|
| Input of Products: | | |
| Degras_____pounds__ | 1,000 | 1,000 |
| Mineral Oil Diluent_____do____ | 1,000 | 1,000 |
| $P_2S_5$_____do____ | 230 | 230 |
| Calcium as Ca_____do____ | 43 | 0 |
| Total_____do____ | 2,273 | 2,230 |
| Output of Products: | | |
| Separated Reaction Product (Oil free)_____pounds__ | 1,073 | 816 |
| Mineral Oil_____do____ | 1,000 | 1,000 |
| Total Reaction Product and Oil_____do____ | 2,073 | 1,816 |
| Insolubles or Sludge_____do____ | 200 | 414 |
| Yield of Reaction Product (Based on Degras charged)_____per cent__ | 107.3 | 81.6 |
| Insolubles or Sludge (Based on Degras charged)_____per cent__ | 20 | 41.4 |
| Characteristics of Reaction Product: | | |
| Acid Number_____ | 10 | 10 |
| Ash Content_____per cent__ | 0.5 | 1.45 |
| Sulfur Content_____do____ | 5.5 | 6.5 |

From the above analysis it will be seen that the yield is considerably improved in accordance with the invention. The sulfur content is higher, which is a desirable property, since the inhibiting properties of the reaction product are a function in part of the sulfur content. The ash content is somewhat higher, but this is attributed to the fact that slightly more lime was used than is essential for neutralization and the lime salt or soap of the reaction product was formed as described hereinafter.

The by-product which separates in the comparative process is a black, viscous, heavy, sludge-like material which hardens when cold and is completely amorphous in character. It is difficult to dispose of. The by-product which separates in accordance with the improved process are particles of a solid, white crystalline material which upon analysis showed 27% calcium and 25% phosphorus and which is thought to be one of the calcium phosphates or mixture of them.

In the above example, the neutralization is accomplished when about half of the $P_2S_5$ has been added. The point in the process is not critical and the neutralization may be accomplished when somewhat less or more than half of the $P_2S_5$ has been added. Inasmuch as the effect of the by-product in increasing the sludge content is not particularly serious until the reaction is about 80% accomplished, this suggests that the neutralization can be accomplished when from ⅕ to ⅘ of the $P_2S_5$ has been added. The optimum point seems to be closer to the half-way mark.

If desired the neutralization can be accomplished in two intermediate steps, for example, when a third of the $P_2S_5$ has been added, and again when two-thirds has been added. However, the improvements obtained thereby are not significant over the single neutralization about midway and the additional processing operations required to neutralize at more than one point before the end of the reaction may not justify the same.

The amount of the lime used for neutralization should be correlated with the amount of $P_2S_5$ and the amount of oxygen in the oxygen-containing raw material. In the above example, for instance, the degras contains about 8.2% oxygen and about 23% of $P_2S_5$ is the optimum amount for the reaction. This would yield 14.4% $P_2O_5$ based on the degras, which would require about 7.5% of calcium hydroxide to convert the same to a calcium phosphate. In the example, a total of 8% of lime hydrate was used to insure complete neutralization. The amount to be used with other oxygen-containing raw materials similarly may be calculated. It is not essential that the amount be sufficient for complete neutralization of the intermediate point in the reaction or at the end provided the amount of the phosphorus and oxygen-containing by-product is neutralized to a point where its polymerizing or other degrading influences is sufficiently minimized.

If the calcium salt or soap of the reaction product is to be formed, such as described hereinafter, there is no objection to using more lime at the intermediate or final neutralization step, and the latter step may employ enough lime to convert the reaction product to the calcium salt thereof.

If the reaction product is to be converted into the salt of a metal other than calcium, such as the mixture of barium and calcium salts, it is, of course, necessary to add these two metals in the desired relationship after the neutralization of the intermediate product has been completed.

Alkaline materials other than lime may be used, such as caustic soda or caustic potash, soda ash and organic bases. However, lime is the cheapest of the available materials and the calcium phosphate formed is insoluble and separates readily.

In carrying out the reaction between the phosphorus sulfide and the oxygen containing-raw material in accordance with the process of the invention the temperature should be above the temperature for thiophosphate formation. It is well known that at lower temperatures the reaction of oxygen-containing compounds with a sulfide of phosphorus results in the formation of thiophosphates apparently with the inclusion of both the phosphorus and the sulfur in the final reaction product. By use of higher temperatures, in accordance with the process of the invention, a minimum amount of phosphorus enters into the reaction product and it also contains a minimum of oxygen. This is apparent in view of the above explanation that the phosphorus is thought to combine with the oxygen in the oxygen-containing raw material and to separate in a sludge, probably in the form of an oxide of phosphorus. This is not meant to say that when the invention is practiced on a commercial scale the reaction product will not contain any phosphorus and oxygen, and it may contain as high as about 2% each of phosphorus and oxygen. Generally the amounts are much less. This amount of oxygen is far less, however, than the oxygen content of the original reacting raw material and is far less than the oxygen content of a true thiophosphate. Similarly this amount of phosphorus is far less than would be present if all of the phosphorus of the phosphorus sulfide combined with the oxygen-containing starting material, such as would be the case in the formation of true thiophosphates.

The temperature may vary somewhat depending upon the molecular weight of the oxygen-containing raw material, its chemical configuration and the rate of the reaction desired. The lower temperature limit in any case may be determined readily by analysis of the reaction product to determine if it is a thiophosphate. If it is, the temperature that has been employed is too low to make the wanted type of reaction product. In view of the many variables involved it is difficult to assign reaction temperatures in numerical terms, that is, the optimum value for all of the different oxygen-containing raw materials that may be used in practicing the process, but in general the temperature should be above 270° F. and preferably within the range of 290° to 310° F. Temperatures within the range of 350° to 400° F. are not required in order that the reaction may proceed at a reasonable rate. Since the use of higher temperatures requires more accurate control, and since additional heat losses result through radiation, there is no advantage in using a higher temperature than is necessary.

Another important consideration is the amount of the phosphorus sulfide, and in general this should be at least about equivalent to the theoretical quantity required for the replacement of all of the oxygen in the oxygen-containing raw material by sulfur from the phosphorus sulfide. Since the atomic weight of sulfur is just double that of oxygen it is desirable to use an amount of phosphorus sulfide such that the weight of the sulfur therein is about double the weight of the oxygen in the oxygen-containing raw material. The amount can be readily determined by simple chemical calculations if the oxygen-containing raw material is a true chemical compound, or by an analysis of the oxygen contained therein if it is a mixture.

A small excess of a theoretical amount of the phosphorus sulfide, for example, not materially in excess of 10%, may be of assistance in forcing the reaction to completion. There is no point in using more, since it wastes the phosphorus sulfide. It is also likely that a part of any additional excess may remain dissolved in the reaction product and there appears to be little advantage in the inclusion of phosphorus and sulfur in the reaction product in this form.

This phosphorus sulfide to be used, preferably is phosphorus pentasulfide, since this is readily available commercially and the reaction proceeds well with it. Any other phosphorus sulfide may be used, however, for example, phosphorus sesquisulfide.

The process is applicable to a wide variety of oxygen-containing organic compounds or mixtures thereof as the raw material. Preferably these raw materials should have a boiling point above the reaction temperature in order to maintain them in the liquid or solid form in the reaction phase without the use of pressure. If the reaction temperature is the minimum, i. e., about 270° F., this would be the minimum boiling point for the organic oxygen-containing raw material. Generally the raw material should have a boiling point of at least 300° F.

Included in the various oxygen-containing materials are alcohols, for example, lauryl alcohol, stearyl alcohol and oleyl alcohol as illustrative of the monoatomic alcohols, and various glycols and glycol polymers as illustrative of the polyatomic alcohols. Phenols and cyclic alcohols are additional examples.

Organic acids may be used such as the saturated and unsaturated fatty acids, i. e., caproic, myristic, palmitic and stearic, and higher molecular weight fatty acids, also oleic and unsaturated fatty acids. Polybasic acids are additional examples. The various naphthenic and cyclic acids, such as acids derived from mineral oils may be used and also aromatic acids, such as naphthalic, benzoic and naphthoic acids.

The process is applicable to esters, for example, fatty acid esters of monoatomic alcohols. In this group are contained the ester type waxes which are particularly adapted for use as the raw material. Examples are degras, lanolin, beeswax, sperm oil, carnauba wax, Japan wax, Chinese wax, spermaceti, whale oil and the like. These naturally occurring waxes are rich in the fatty acid esters of monoatomic alcohols although they may include other compounds. Also there may be used in accordance with the invention fatty acid esters of monoatomic alcohols having a lesser total number of carbon atoms than is generally contained in the waxes. For example, methyl, ethyl, propyl and butyl palmitates, oleates, stearates; cetyl, stearyl or oleyl propionates or butyrates; and esters in which both the acid and alcohol radical are intermediate molecular weights, such as octyl caproate. Esters of fatty acid esters of polyatomic alcohols, such as glycols and glycerol may be used. In the latter group is contained the wide variety of naturally occurring animal and vegetable oils and fats such as tallow, palm oil, etc.

Other organic oxygen-containing compounds include the ketones, aldehydes and ethers of sufficiently high molecular weight to have the requisite boiling point.

Any of the above mentioned compounds may be of the substituted type, such as the halogenated compounds, illustrative of which are chlorobenzoic acid, dichlorostearic acid, methyldichlorostearate, methylchloronaphthenate and dichlorobenzoic acid; also hydroxy substituted compounds, such as hydroxystearic acid, dihydroxybenzoic acid, hydroxynaphthenic acid, dihydroxystearic acid and dichlorodihydroxystearic acid. The organic compounds may be derived from a mineral source such as fatty acids from petroleum and oxidized petroleum fatty acids, oxidized oils, such as used crank case oil containing a substantial amount of oxygen-containing compounds.

Any of the above compounds may be used in admixture with each other or in admixture with other compounds in which the oxygen-containing compound is the predominant ingredient of the mixture.

Preferably the compound or mixture thereof should not be too unsaturated. The compounds of an iodine value over about 25 to 50 give somewhat lower yields because of their tendency to polymerize more readily. However, this is not so important a consideration in accordance with the invention since highly unsaturated compounds which would be unsuitable for the prior process can be used to obtain reasonable yields in accordance with the invention because of the conditions minimizing polymerization. If desired, the iodine value of any of the compounds may be reduced by hydrogenation.

The separated reaction product may be converted into the corresponding basic compound which may be of an organic nature, such as an amine, an alkylolamine, pyridine or any other compounds generally recognized in the class of organic bases; or the basic compound may be of metallic origin such as a metal oxide or hydroxide. These metals may be an alkali metal such as potassium or sodium or an alkaline earth metal such as calcium, barium or magnesium. The metal also may be aluminum or metals lower than aluminum in the electromotive series, such as chromium, cadmium, cobalt, antimony, bismuth, zinc, tin, arsenic, mercury, etc.

The metal should be selected with reference to the use for the composition and the properties desired in it. For example, metals which are known to have a pro-oxygenic effect such as iron and copper, may be used in making additives for gear box greases, but preferably not in additives for lubricants for internal combustion engines operating at high temperatures where pro-oxygenic conditions are exaggerated. The alkali metals have emulsifying characteristics; the alkaline earth metals have excellent detergent characteristics; and the heavier metals have desirable surface inhibition characteristics.

A plurality of metals may be used when the composition is to have the different properties imparted by the different metals, such as calcium and barium; or one of them with a heavier metal, such as arsenic, tin or zinc; or potassium or sodium with an alkaline earth metal and/or any of the so-called heavier metals.

The amount of the basic compound to be employed will depend largely upon the molecular weight of the basic compound and the acid number of the reaction product. If a truly neutral additive is wanted the amount should be sufficient to reduce the acid number to zero. Generally this amount will vary from 1 to 15% depending upon the factors mentioned. The amount also will depend upon whether the reaction product is to be completely or only partially saponified or neutralized. If desired the amount of the basic compound may be such as to reduce the acid number from 20; for example, to 10 rather than to 0. This will leave the final product as a mixture of the initial unsaponified reaction product and the basic compound thereof. Such a mixture is advantageous under some circumstances since it may embody the emulsifying, detergent, or inhibiting features of the various saponified products together with the effect of the polar groups in the unsaponified portions.

In the case of a mixture of two or more of the metals in either a completely or partially saponified product, I am not certain if both of the metals chemically combine in a single molecule of the reaction product or if the saponified additive comprises a mixture in which the two different metals are in different molecules. However, either possibility is intended to be covered and included within my description of a plural metal compound of the reaction product.

In the case of certain heavier metals the oxides or hydroxides of which are less reactive it may be desirable first to convert the initial reaction product to the alkali metal compound thereof and this may then be reacted with the salt of the desired higher metal to replace the alkaline metal. If desired only a part of the alkali metal may be replaced by the heavier metal and this affords an easy way to obtain a dual metal compound of an alkali or alkaline earth metal with a heavier metal.

As illustrative of such a basic compound, the above described degras-$P_2S_5$ reaction product, after separation from the insoluble residue, is saponified with 3% of lime hydrate and 12% of barium hydrate by weight based upon the amount of the reaction product present. The saponification is carried out at a temperature of about 175° to 200° F., preferably about 180° F. by agitating the reaction product (diluted in the mineral oil) with the above named hydrates for a period of about 4 hours in the presence of water. Following this the temperature is raised to 250° F. to dry out the product. Preferably the lime and barium hydrates are added slowly so as not to cause undue heat generation which results in foaming and the loss of water due to temperature rise. Alternatively the reaction may be carried in a pressure vessel at a temperature above the boiling point of water and under pressure so as to retain the water present until the saponification action is complete.

The barium and lime compound of the reaction product made in accordance with the above specific example was analyzed chemically and compared with the same reaction product made by the comparative process.

| Chemical Composition | Improved Process | Comparative Process |
|---|---|---|
| | Percent | Percent |
| Carbon | 80.78 | 79.22 |
| Hydrogen | 11.60 | 11.64 |
| Sulfur | 4.5 | 4.41 |
| Phosphorus | 0.63 | 0.74 |
| Ash (as sulfate) | 5 | 5 |

The above composition, comprising the barium-lime compound of the reaction product prepared in accordance with the above specific example and the mineral oil, was added to a Mid-Continent S. A. E. 30 lubricating oil in an amount of 10% and compared with the same oil containing the additive prepared in accordance with the prior art process and in an amount to achieve the same amount of the additive in the oil. The two oils were tested in an ethyl motor under Procedure IV and the conditions of the test are as follows:

Speed ------------------ 1200 R. P. M.
Jacket Temperature ----- 212° F.
Sump Temperature ------ 300° F.
Air-Fuel Ratio --------- 15:1
Compression Ratio ------ 7:1
Fuel ------------------- Gasoline (X-70)
Catalyst --------------- 0.1% $Fe_2O_3$ as Neodex Iron Naphthanate
Running Time ---------- 16 hrs.

The data from the test are as follows:

| | Oil without Additive | Oil made by Improved Process | Oil with Additive made by Comparative Process | Oil with Additive made by Regular Process |
|---|---|---|---|---|
| Sludge percent | 6.0 | 0.30 | 0.15 | 0.30 |
| Acid | 4.5 | 2.6 | 2.0 | 2.5 |
| Viscosity Index S. S. U. | 600.0 | 54 | 60 | 42 |
| Skirt Number | 8.0 | 0.0 | 0.0 | 0.0 |
| Demerit Rating | 24.5 | 3.47 | 2.75 | 3.20 |

From the above it will be seen that the product made in accordance with the improved process of the invention has properties of the same order as the product made by the regular and comparative processes, thereby demonstrating that the improved yield is not accompanied by any reduction in the improved properties of the additive.

The amount of the initial reaction product, or the basic compound thereof, which may be added to an oil or grease may vary depending upon its characteristics and the use for which it is intended. Some oils have more of a tendency to form acid and sludge than others, depending upon their origin and constitution, and these oils may require a larger amount of the additive. Oils that are intended for high temperature uses may require larger amounts of the additive. In general, the range is from 1 to 15% of the true reaction product or basic compound thereof, but under some circumstances amounts as low as 0.1% show a remarkable improvement. Inasmuch as the additive itself is a lubricant there is no upper limit to the amount that may be added to the oil. Since the invention is concerned with the process of making the additive, rather than the additive itself, it is believed unnecessary to describe further the properties and uses of the additive in order that the process of the invention may be understood.

It will be obvious to one skilled in the art that a wide variety of materials fall within the group defined generically herein and that various processing procedures may be adopted in accordance with the invention. For example, the heat also may be dissipated in part by more efficient cooling coils in the reaction kettle. This could also be accomplished by carrying out the reaction in an inert solvent, such as a hydrocarbon boiling at the desired temperature so as to absorb the heat on the vaporization of the solvent which could be condensed and returned. It is believed unnecessary to lengthen the specification with additional examples since the scope of the invention and the method of practicing it as set forth in the following claims may be fully understood from the description heretofore.

I claim:

1. A process of preparing lubricants and additives for mineral oils to improve their lubricating properties, which process comprises reacting a part of a total amount of a phosphorus sulfide at a temperature of at least about 270° F. with an organic oxygen-containing compound having a boiling point above said temperature and reacting with the phosphorus sulfide to form an oil-soluble reaction product, adding an amount of an alkaline reacting compound to neutralize at least part of a phosphorus and oxygen-containing by-product formed in said reaction, reacting the remainder of the amount of the phosphorus sulfide, the total amount being at least about the amount required to complete the reaction that occurs at said temperature.

2. A process of preparing lubricants and additives for mineral oils to improve their lubricating properties, which process comprises reacting a part of a total amount of a phosphorus sulfide at a temperature of at least about 270° F. with an organic oxygen-containing compound having a boiling point above said temperature and reacting with the phosphorus sulfide to form an oil-soluble reaction product, adding an amount of an alkaline reacting compound to neutralize at least part of a phosphorus and oxygen-containing by-product formed in said reaction, reacting the remainder of the amount of the phosphorus sulfide, the total amount being at least about the amount required to complete the reaction that occurs at said temperature, neutralizing the additional amount of said by-product, and separating the reaction product from the neutralized by-product.

3. A process of preparing lubricants and additives for mineral oils to improve their lubricating properties, which process comprises reacting a part of a total amount of phosphorus pentasulfide at a temperature of at least about 270° F. with an organic oxygen-containing compound having a boiling point above said temperature and reacting with the phosphorus pentasulfide to form an oil-soluble reaction product, adding lime in an amount to neutralize at least part of a phosphorus and oxygen-containing by-product formed in said reaction, reacting the remainder of the amount of the phosphorus pentasulfide, the total amount being at least about the amount required to complete the reaction that occurs at said temperature.

4. A process of preparing lubricants and additives for mineral oils to improve their lubricating properties, which process comprises reacting a part of a total amount of phosphorus pentasulfide at a temperature of at least about 270° F. with an organic ester having a boiling point above said temperature and reacting with the phosphorus pentasulfide to form an oil-soluble reaction product, adding an amount of an alkaline compound to neutralize at least part of a phosphorus and oxygen-containing by-product formed in said reaction, reacting the remainder of the amount of the phosphorus pentasulfide, the total amount being at least about the amount required to complete the reaction that occurs at said temperature.

5. A process of preparing lubricants and additives for mineral oils to improve their lubricating properties, which process comprises reacting about half of a total amount of phosphorus pentasulfide at a temperature of at least about 275° F. with an ester type wax, adding an amount of lime to neutralize a phosphorus and oxygen-containing by-product formed in said reaction, and then reacting the remaining half of the phosphorus pentasulfide, the total amount being at least about the amount required to complete the reaction that occurs at said temperature, neutralizing the additional amount of said by-product with lime, and separating the reaction product from the neutralized by-product.

6. A process of forming a composition of matter suitable for use as a lubricant and as an additive for mineral oils to improve their lubricating properties, which process comprises reacting about half of a total amount of phosphorus pentasulfide at a temperature of at least about 275° F. with degras, adding an amount of lime to neutralize a phosphorus and oxygen-containing by-product formed in said reaction, and then reacting the remainder of the phosphorus pentasulfide, the total amount being at least about the amount required to complete the reaction that occurs at said temperature, neutralizing the additional amount of said by-product with lime, and separating the reaction product from the neutralized by-product.

7. A process of preparing lubricants and additives for mineral oils to improve their lubricating properties, which process comprises reacting a part of a total amount of a phosphorus sulfide at a temperature of at least about 270° F. with an oxygen-containing compound having a fatty radical and having a boiling point above said temperature and reacting with the phosphorus sulfide to form an oil-soluble reaction product, adding an amount of an alkaline compound to neutralize at least part of a phosphorus and oxygen-containing by-product formed in said reaction, reacting the remainder of the amount of the phosphorus sulfide, the total amount being at least about the amount required to complete the reaction that occurs at said temperature.

8. A process of preparing lubricants and additives for mineral oils to improve their lubricating properties, which process comprises reacting a part of a total amount of a phosphorus sulfide at a temperature of at least about 270° F. with a fatty acid having a boiling point above said temperature, adding an amount of an alkaline compound to neutralize at least part of a phosphorus and oxygen-containing by-product formed in said reaction, reacting the remainder of the amount of the phosphorus sulfide, the total amount being at least about the amount required to complete the reaction that occurs at said temperature.

9. A process of preparing lubricants and additives for mineral oils to improve their lubricating properties, which process comprises reacting a part of a total amount of a phosphorus sulfide at a temperature of at least about 270° F. with a $C_{18}$ fatty acid, adding an amount of an alkaline compound to neutralize at least part of a phosphorus and oxygen-containing by-product formed in said reaction, reacting the remainder of the amount of the phosphorus sulfide, the total amount being at least about the amount required to complete the reaction that occurs at said temperature.

10. A process of preparing lubricants and additives for mineral oils to improve their lubricating properties, which process comprises reacting a part of a total amount of a phosphorus sulfide at a temperature of at least about 270° F. with a fatty acid glyceride, adding an amount of an alkaline compound to neutralize at least part of a phosphorus and oxygen-containing by-product formed in said reaction, reacting the remainder of the amount of the phosphorus sulfide, the total amount being at least about the amount required to complete the reaction that occurs at said temperature.

11. A process of preparing lubricants and additives for mineral oils to improve their lubricating properties, which process comprises reacting a part of a total amount of a phosphorus sulfide at a temperature of at least about 270° F. with a vegetable oil, adding an amount of an alkaline compound to neutralize at least part of a phosphorus and oxygen-containing by-product formed in said reaction, reacting the remainder of the amount of the phosphorus sulfide, the total amount being at least about the amount required to complete the reaction that occurs at said temperature.

JOHN M. MUSSELMAN.

REFERENCES CITED

The following references are of record in the file of this patent:

UNITED STATES PATENTS

| Number | Name | Date |
|---|---|---|
| 1,929,443 | Milligan | Oct. 10, 1933 |
| 2,115,150 | Seyfried | Apr. 26, 1938 |
| 2,331,923 | Musselman | Oct. 19, 1943 |